United States Patent
Itoh

(10) Patent No.: US 11,863,873 B2
(45) Date of Patent: Jan. 2, 2024

(54) IMAGE CAPTURING APPARATUS, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/491,664

(22) Filed: Oct. 1, 2021

(65) Prior Publication Data

US 2022/0021800 A1  Jan. 20, 2022

Related U.S. Application Data

(63) Continuation of application No. 16/571,954, filed on Sep. 16, 2019, now Pat. No. 11,165,966.

(30) Foreign Application Priority Data

Sep. 19, 2018 (JP) .................................. 2018-175131
Jul. 22, 2019 (JP) .................................. 2019-134378

(51) Int. Cl.
  *H04N 23/73*  (2023.01)
  *G06T 7/20*   (2017.01)
  *H04N 23/61*  (2023.01)
  *H04N 23/71*  (2023.01)

(52) U.S. Cl.
  CPC ............... *H04N 23/73* (2023.01); *G06T 7/20* (2013.01); *H04N 23/61* (2023.01); *H04N 23/71* (2023.01)

(58) Field of Classification Search
  CPC .................................................... H04N 5/2353
  USPC .......................................................... 348/364
  See application file for complete search history.

(56) References Cited

U.S. PATENT DOCUMENTS

| 9,558,580 B2 | 1/2017 | Itoh |
| 10,145,790 B2 | 12/2018 | Itoh |
| 2012/0008040 A1 | 1/2012 | Miyata |
| 2012/0038797 A1 | 2/2012 | Jang |

(Continued)

FOREIGN PATENT DOCUMENTS

| JP | 2004120298 A | 4/2004 |
| JP | 2010136205 A | 6/2010 |

(Continued)

OTHER PUBLICATIONS

Notice of Reasons for Refusal issued in corresponding JP Patent Application No. 2019-134378, dated Apr. 11, 2023, pp. 1-10, with English translation.

*Primary Examiner* — Joel W Fosselman
(74) *Attorney, Agent, or Firm* — Carter, DeLuca & Farrell LLP

(57) ABSTRACT

In an embodiment of the present disclosure, an image capturing apparatus capable of capturing an image while controlling an image capturing condition on a pixel-by-pixel basis or on a region-by-region basis comprises: an identification unit configured to identify a moving object region in the image on the basis of motion information on an object; and a setting unit configured to set the image capturing condition for each pixel or each region such that an identical shutter speed is applied to pixels corresponding to the moving object region.

15 Claims, 10 Drawing Sheets

(56) References Cited

U.S. PATENT DOCUMENTS

2012/0281133 A1 11/2012 Kurita
2016/0344965 A1* 11/2016 Grauer ................. H04N 25/135

FOREIGN PATENT DOCUMENTS

JP 2013-255080 A 12/2013
WO 2017/192152 A1 12/2014

* cited by examiner (a)

(b)

(c)

| BRIGHTNESS MAP VALUE | 0 | 50 | 100 | 150 | 200 |
|---|---|---|---|---|---|
| ISO | +2 | +1 | 0 | −1 | −2 |

FIG.7A

| BRIGHTNESS MAP VALUE | 0 | 50 | 100 | 150 | 200 |
|---|---|---|---|---|---|
| Tv | +2 | +1 | 0 | −1 | −2 |

FIG.7B

| MOVING OBJECT MAP VALUE | 0~127 | 128~191 | 192~255 |
|---|---|---|---|
| UPDATED VALUE | 0 | 128 | 255 |

| AVERAGE ILLUMINANCE DISTRIBUTION MAP VALUE | 0 | 50 | 100 | 150 | 200 |
|---|---|---|---|---|---|
| SHUTTER SPEED CHANGE AMOUNT | +2 | +1 | 0 | -1 | -2 |

FIG.10B

| ILLUMINANCE DISTRIBUTION MAP VALUE | ~0 | 50 | 100 | 150 | 200 |
|---|---|---|---|---|---|
| ANALOG GAIN CHANGE AMOUNT | +1 | +1 | 0 | -1 | -1 |
| DIGITAL GAIN CHANGE AMOUNT | +1 | 0 | 0 | 0 | -1 |

IMAGE CAPTURING APPARATUS, METHOD OF CONTROLLING IMAGE CAPTURING APPARATUS, AND STORAGE MEDIUM

CROSS REFERENCE TO RELATED APPLICATIONS

This application is a continuation of U.S. patent application Ser. No. 16/571,954, filed on Sep. 16, 2019, which claims the benefit of and priority to Japanese Patent Application No. 2018-175131, filed on Sep. 19, 2018 and Japanese Patent Application No. 2019-134378, filed Jul. 22, 2019, each of which is hereby incorporated by reference herein in their entirety.

BACKGROUND OF THE INVENTION

Field of the Invention

The present disclosure relates to a technique for an image capturing apparatus to generate an image of a scene with a wide dynamic range.

Description of the Related Art

Conventionally, a technique disclosed in Japanese Patent Laid-Open No. 2004-120298 has been proposed as a technique of capturing an image of a moving object by using an image capturing apparatus such as a video camera. In this technique, the moving speed of a moving object is estimated from a plurality of frames in a moving image, and the image capturing condition such as the shutter speed and the aperture is adjusted according to the estimated moving speed. Using this technique enables an image of a moving object to be captured under the optimal image capturing condition adjusted for the moving object.

Also, a technique has been proposed which controls the exposure amount on a pixel-by-pixel basis to perform image capturing with a dynamic range corresponding to the luminance range of the scene (see Japanese Patent Laid-Open No. 2010-136205).

The exposure is determined by the shutter speed, the aperture, and the sensitivity. However, in the capturing of a moving image, the aperture is usually fixed, and the shutter speed is therefore adjusted to adjust the exposure. Here, in a case of using the technique disclosed in Japanese Patent Laid-Open No. 2004-120298 to determine the shutter speed according the moving speed of a moving object, it is difficult to handle a scene with a wide dynamic range. Specifically, with the technique disclosed in Japanese Patent Laid-Open No. 2004-120298, overexposure is likely to occur at a bright region around a moving object in a case where the shutter speed is low, and underexposure is likely to occur at a dark region around a moving object in a case where the shutter speed is high.

On the other hand, in a case where an image of a scene with moving objects is captured using the technique disclosed in Japanese Patent Laid-Open No. 2010-136205, if regions differing in brightness are present in a moving object, different shutter speeds may be set for the pixels in those regions. In that case, an image may possibly be generated in which the amount of blur in the same moving object resulting from its motion differs depending on the pixel position. A moving object portion in such an image has a sense of incongruity.

The present disclosure has been made in view of such a problem, and a purpose thereof is to provide an image capturing apparatus, a method of controlling the image capturing apparatus, and a storage medium capable of generating an image of a scene with a wide dynamic range in such a manner as to prevent a sense of incongruity in a moving object portion.

SUMMARY OF THE INVENTION

In an embodiment of the present disclosure, an image capturing apparatus capable of capturing an image while controlling an image capturing condition on a pixel-by-pixel basis or on a region-by-region basis comprises: an identification unit configured to identify a moving object region in the image on the basis of motion information on an object; and a setting unit configured to set the image capturing condition for each pixel or each region such that an identical shutter speed is applied to pixels corresponding to the moving object region Further features of the present disclosure will become apparent from the following description of exemplary embodiments with reference to the attached drawings.

BRIEF DESCRIPTION OF THE DRAWINGS

FIGS. 7A and 7B are diagrams showing an example of image capturing condition changing tables in one embodiment;

FIG. 9 is a diagram showing an example of a moving object map value changing table in one embodiment; and FIGS. 10A and 10B are diagrams showing an example of image capturing condition changing tables in one embodiment.

DESCRIPTION OF THE EMBODIMENTS

Embodiments of the present disclosure will be specifically described below with reference to the accompanying drawings. Note that the configurations shown in the following embodiments are mere examples, and the present disclosure is not necessarily limited to the illustrated configurations.

First Embodiment

Overview

An overview of a first embodiment will be described. In the present embodiment, the exposure condition for each pixel of a sensor is determined on the basis of a moving object map provided from a moving object map obtaining unit and a brightness map provided from a brightness map obtaining unit. The sensor used is, for example, a sensor capable of setting an image capturing condition on a pixelby-pixel basis as disclosed in Japanese Patent Laid-Open No. 2010-136205. For this reason, the image capturing condition includes the setting values of shutter speed and sensitivity for each pixel.

Also, in the present embodiment, the moving object map and the brightness map are each formed of a smaller number of pixels than the number of pixels in the sensor. The values in the moving object map are referred to, and the shutter speed setting values of pixels that are likely to be a moving object are set to an identical value in the object. Then, the exposure setting for each pixel is changed on the basis of the brightness map. Details of these processes will be described below.

Configuration of Apparatus

Figure 1:
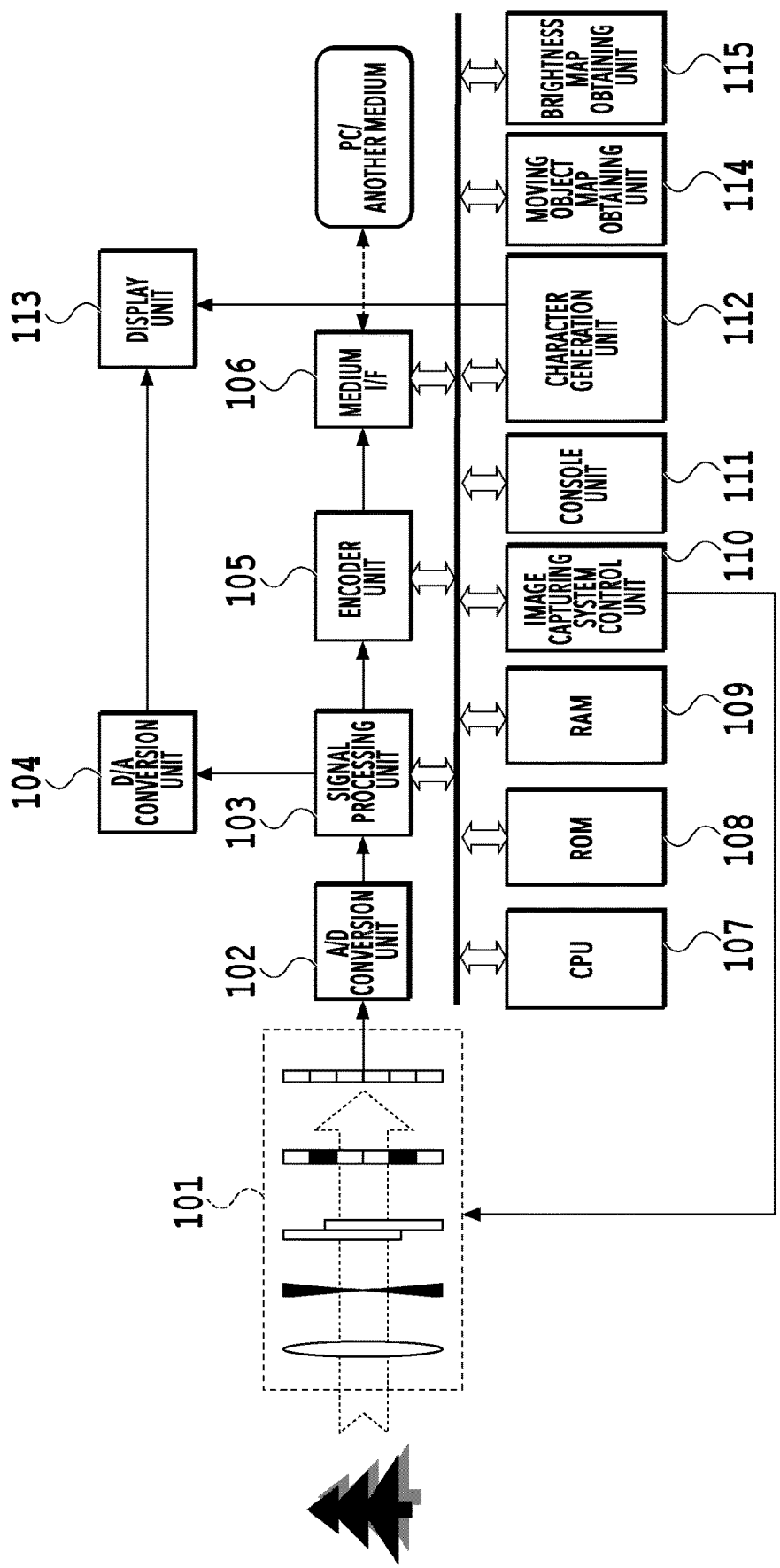
FIG. 1 is a configuration diagram of an image capturing apparatus in one embodiment.

FIG. 1 is a configuration diagram of an image capturing apparatus in an embodiment. The image capturing apparatus in the present embodiment is capable of setting an image capturing condition such as shutter speed and ISO sensitivity on a pixel-by-pixel basis, and is capable of capturing an image while controlling the exposure amount on a pixel-by-pixel basis.

An image capturing unit 101 is a unit that detects light from objects. The image capturing unit 101 includes, for example, a zoom lens, a focus lens, an image stabilizing lens, an iris, a shutter, an optical low-pass filter, an IR cut filter, a color filter, and a sensor such as a CMOS or a CCD.

An A/D conversion unit 102 is a unit that converts the amounts of light detected from objects into digital values.

A signal processing unit 103 is a unit that performs signal processing on the digital values to generate a digital image. For example, the signal processing unit 103 performs demosaicing processing, white balance processing, gamma processing, and so on.

A D/A conversion unit 104 performs an analog conversion process on the digital image obtained by the signal processing unit 103 for display.

An encoder unit 105 is a unit that performs a data compression process on the digital image. For example, the encoder unit 105 performs a process of compressing the digital image in JPEG format or the like.

A medium interface (medium I/F) unit 106 is an interface that connects the image capturing apparatus to a PC or another medium (e.g., a hard disk drive, a memory card, a CF card, an SD card, a USB memory, or the like).

The CPU 107 is involved in all of the processes by the above constituent elements. An ROM 108 and an RAM 109 provide programs, data, work areas, and so on necessary for the processes to the CPU 107. Also, in a case where a control program necessary for a process to be described later is stored in the ROM 108, the control program is loaded into the RAM 109 and then executed by the CPU 107.

A console unit 111 is a unit that receives instructions from the user and are, for example, buttons, a mode dial, a touchscreen included in a display unit 113, and so on. In the present embodiment, the console unit 111 also receives an input for switching between high dynamic range (HDR) output and standard output.

A character generation unit 112 is a unit that generates characters and graphics.

The display unit 113 is a unit that displays captured images and images such as GUIs. Generally, a CRT display, a liquid crystal display, or the like is used. Also, a publicly known touchscreen may be used. In this case, an input through the touchscreen can be handled as an input into the console unit 111.

A moving object map obtaining unit 114 is a component that detects whether an object captured by the image capturing unit 101 is moving. For example, the moving object map obtaining unit 114 obtains pieces of image data captured in time series from the image capturing unit 101, and averages the changes in luminance between the pieces of captured image data in units of a plurality of pixels to thereby generate motion information on objects on a pixel-by-pixel basis. In a case where the average of the luminance changes is large, the motion information is generated as pixels with a motion. In a case where the average of the luminance changes is small, the motion information is generated as pixels with no motion. The moving object map obtaining unit 114 generates such motion information for each pixel in the image, and holds these pieces of motion information thus generated as a moving object map. Details of the moving object map will be described later. Note that the moving object map may be obtained not only by the above method but also by other methods. For example, the moving object map can also be generated by comparing the difference between the pixel values at the same pixel position in two pieces of image data captured in time series with a predetermined threshold value, and determining a pixel with a large difference as a moving object region while determining a pixel with a small difference as a non-moving object region.

A brightness map obtaining unit 115 obtains a brightness map indicating the brightness of objects on a pixel-by-pixel basis from captured image data obtained by the image capturing unit 101. For example, the brightness map obtaining unit 115 averages brightness information of pixels obtained from the sensor in units of a plurality of pixels, and stores the result as the image's brightness map. Details of the brightness map will be described later.

An image capturing system control unit 110 is a unit that controls an image capturing system as instructed by the CPU 107. In the present embodiment, an image capturing condition, such as shutter speed and ISO sensitivity, set by the image capturing system control unit 110 is set for the image capturing unit 101 on a pixel-by-pixel basis. Also, the image capturing system control unit 110 performs control such as bringing the lens into focus, opening the shutter, and adjusting the iris.

Note that the image capturing apparatus includes various constituent elements other than the above. However, they are not main features of the present disclosure, and description thereof is therefore omitted.

An image capturing condition setting process to be described in the present embodiment involves: obtaining the moving object map from the moving object map obtaining unit 114; obtaining the brightness map from the brightness map obtaining unit 115; and generating image capturing condition data for controlling the image capturing system control unit 110 on the basis of the moving object map and the brightness map. The CPU 107 performs the image capturing condition setting process by loading a control program stored in the ROM 108 into the RAM 109 and executing it.

Brightness Map and Moving Object Map

The brightness map and the moving object map used in the present embodiment will be described below with reference to a schematic diagram in FIG. 2.

Figure 2:
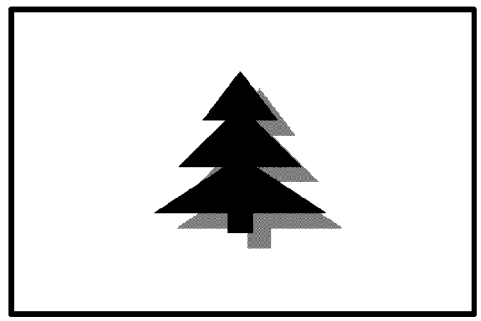
FIG. 2 is a schematic diagram showing (a) a captured image, (b) a brightness map and (c) a moving object map in one embodiment.
Figure 2:
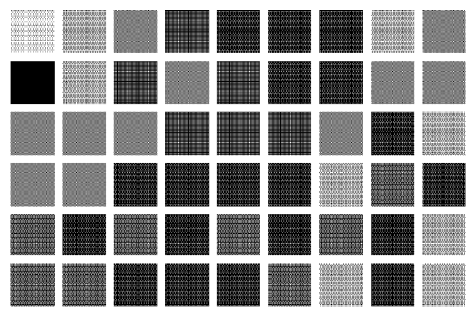
Figure 2:
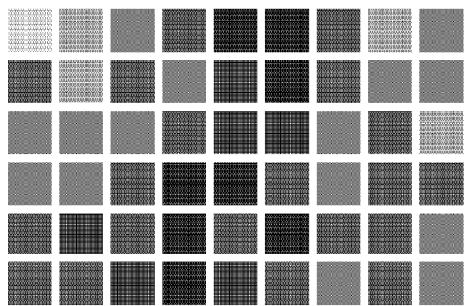

FIG. 2 shows an example of (a) a captured image, (b) the brightness map, and (c) the moving object map. The brightness map and the moving object map are each information formed of a smaller number of pixels than the number of pixels in the captured image. Also, the brightness map and the moving object map are expressed by a smaller number of bits than the captured image. For example, the captured image is expressed by 12 bits, while the brightness map and the moving object map are expressed by 8 bits. In the brightness map, a higher value means a higher illuminance. In the moving object map, a higher value represents a higher probability that the object in the corresponding region contains a moving object.

Overall Flow of Image Capturing Process

Figure 3:
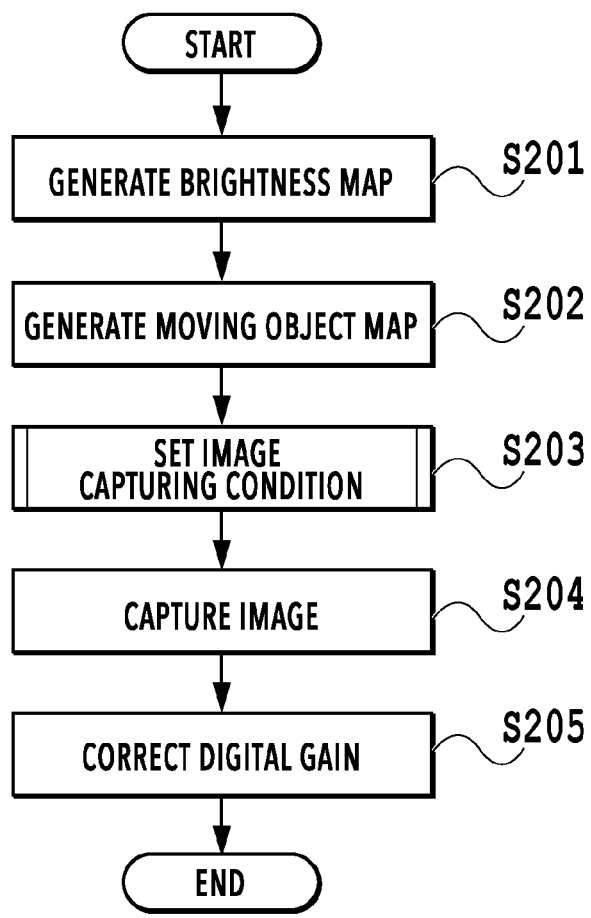
FIG. 3 is a flowchart showing the overall flow of an image capturing process in one embodiment.

The overall flow of an image capturing process in the image capturing apparatus in the present embodiment will be described with reference to a flowchart in FIG. 3. Here, the image capturing process to be described below starts upon input of an instruction to start image capturing with HDR output designated from the console unit 111, for example.

Note that the CPU 107 performs the series of processes shown in the flowchart by loading a control program stored in the ROM 108 into the RAM 109 and executing it. Alternatively, the functions of some or all of the steps in the flowchart may be implemented with hardware such as an ASIC or an electronic circuit. The symbol "S" in the description of each process means a step in the flowchart. This applies to the other flowcharts.

Firstly at S201, the CPU 107 obtains a brightness map of objects by using the brightness map obtaining unit 115.

At S202, the CPU 107 obtains a moving object map of the objects by using the moving object map obtaining unit 114.

At S203, the CPU 107 sets the image capturing conditions to be used by the image capturing unit 101 to perform image capturing on the basis of the brightness map obtained at S201 and the moving object map obtained at S202. In other words, the CPU 107 functions as an image capturing condition setting unit. Details will be described later.

At S204, the CPU 107 transmits the image capturing condition data set at S203 to the image capturing system control unit 110, drives the image capturing unit 101 to capture an image, and obtains captured image data.

At S205, the CPU 107 applies digital gains to the captured image data obtained at S204 according to the differences in exposure amount to thereby adjust the luminance of the entire image. Different image capturing conditions are applied to pixels in the captured image data obtained at S204. Thus, in order to virtually match these image capturing conditions, a digital gain corresponding to the difference in exposure amount is applied to each pixel.

The image capturing process in the image capturing apparatus in the present embodiment is performed in the above-described manner.

Image Capturing Condition Setting Process

Next, the image capturing condition setting process shown at S203 in FIG. 3 will be described with reference to a flowchart in FIG. 4.

At S301, the CPU 107 inputs the moving object map obtained at S201 into the RAM 109.

At S302, on the basis of the moving object map inputted in the RAM 109, the CPU 107 identifies regions corresponding to moving objects as moving object regions. Specifically, the CPU 107 determines the portions in the moving object map with values larger than or equal to a predetermined threshold value as moving object portions and updates these values in the moving object map to 255, which is the maximum value. On the other hand, the CPU 107 determines the portions in the moving object map with values smaller than the predetermined threshold value as non-moving object portions and updates these values in the moving object map to 0, which is the minimum value. Thus, the CPU 107 functions as a moving object region identification unit.

At S303, the CPU 107 inputs the brightness map obtained at S202 into the RAM 109.

At S304, the CPU 107 determines a basic exposure amount for image capturing. The basic exposure amount is determined on the basis of a shutter speed, an ISO sensitivity, an f-stop number designated by the user, for example. Note that the basic exposure amount may be determined by referring to the brightness map obtained from the brightness map obtaining unit 115 and converting the average brightness into an exposure amount, or may be determined by other methods.

At S305, the CPU 107 initializes the position of a pixel whose image capturing condition setting is to be set. For example, the CPU 107 sets the coordinates of the upper left corner as the initial value. The image capturing condition setting process will be performed in turn for the subsequent pixels toward the lower right corner.

At S306, the CPU 107 determines whether the value of the portion in the moving object map corresponding to the position of the pixel to be subjected to the image capturing condition setting process (i.e., the processing target pixel position) is the value indicating a moving object portion (i.e., 255). If the processing target pixel position is determined to be a moving object portion, the CPU 107 proceeds to S307. Otherwise, the CPU 107 proceeds to S308.

At S307, the CPU 107 refers to the value of the portion in an illuminance distribution map corresponding to the processing target pixel position, and sets an image capturing condition with a changed ISO sensitivity. In other words, for a moving object portion, the shutter speed is not changed but the ISO sensitivity is changed. In this way, even in a case where regions differing in brightness are present within a single moving object, the same shutter speed is applied. Then, even if the moving object is blurred, the amount of blur is the same within the moving object. This prevents a sense of incongruity. Details will be described later.

At S308, the CPU 107 refers to the value of the portion in the illuminance distribution map corresponding to the processing target pixel position, and sets an image capturing condition with a changed shutter speed. In other words, for a non-moving object portion, the ISO sensitivity is not changed but the shutter speed is changed. Details will be described later.

At S309, the CPU 107 determines whether the image capturing condition setting process has been finished for all pixels. If the image capturing condition setting process has been finished for all pixels, the CPU 107 terminates the processing. Otherwise, the CPU 107 proceeds to S310.

At S310, the CPU 107 shifts the processing target pixel position to the next pixel position. After the processing for one pixel is finished, the processing target shifts to the immediately right pixel. In a case where the processed pixel is at the right edge, the processing target shifts to the pixel at the left edge in the row immediately below the processed pixel.

ISO Sensitivity Setting Changing Process

Next, the ISO sensitivity setting changing process shown at S307 in FIG. 4 will be described with reference to a flowchart in FIG. 5.

Firstly at S401, the CPU 107 refers to the brightness map stored in the RAM 109.

Figure 4:
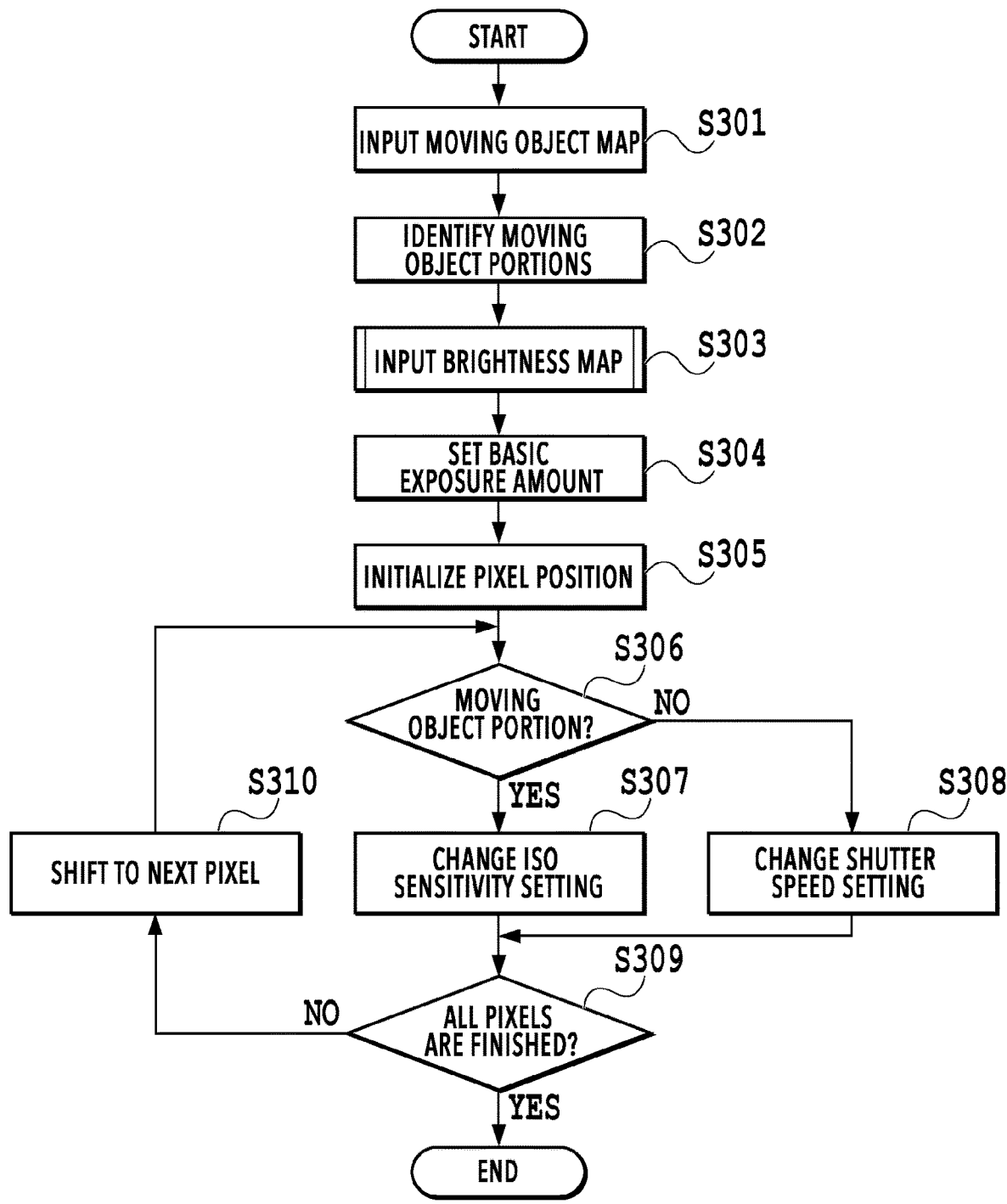
FIG. 4 is a flowchart showing the flow of an image capturing condition setting process in one embodiment.

At S402, the CPU 107 refers to the value of the portion in the brightness map corresponding to the processing target pixel position, and calculates a gain change amount from the brightness difference between the value and the basic exposure amount determined at S304 in FIG. 4. Specifically, the CPU 107 can derive the gain change amount by using equation (1) below.

$$G = \text{round}(L(X,Y)/N(\text{map})) \quad (1)$$

Here, G denotes the gain change amount, L(X, Y) denotes the value of the portion in the brightness map belonging to the same region as the target pixel, and N(map) denotes the number of elements in an image capturing condition changing table shown in FIG. 7A, in which ISO sensitivity setting change amounts are listed. The image capturing condition changing table will be described later.

At S403, the CPU 107 refers to the image capturing condition changing table shown in FIG. 7A and determines the image capturing condition on the basis of the gain change amount derived at S402. Specifically, the CPU 107 refers to a brightness map value range in the image capturing condition changing table on the basis of the value of the gain change amount G, calculated using equation (1), and adds the corresponding ISO sensitivity setting change amount to the ISO sensitivity determined at S304. For example, in a case where the gain change amount G, derived using equation (1), is 75, the CPU 107 refers to the image capturing condition changing table and makes a setting change such that the ISO sensitivity determined at S304 is raised by one stop.

Shutter Speed Setting Changing Process

Next, the shutter speed setting changing process shown at S308 in FIG. 4 will be described with reference to a flowchart in FIG. 6.

Firstly at S501, the CPU 107 refers to the brightness map stored in the RAM 109.

At S502, the CPU 107 refers to the value of the portion in the brightness map corresponding to the processing target pixel position and calculates a gain change amount from the brightness difference between the value and the basic exposure amount determined at S304 in FIG. 4. Specifically, the CPU 107 can derive the gain change amount by using equation (2) below.

$$G' = \text{round}(L(X,Y)/N'(\text{map})) \quad (2)$$

Here, G' denotes the gain change amount, L(X, Y) denotes the value of the portion in the brightness map belonging to the same region as the target pixel, and N'(map) denotes the number of elements in an image capturing condition changing table shown in FIG. 7B. The image capturing condition changing table will be described later.

At S503, the CPU 107 refers to the image capturing condition changing table shown in FIG. 7B and determines the image capturing condition on the basis of the gain change amount derived at S502. Specifically, the CPU 107 refers to a brightness map value range in the image capturing condition changing table on the basis of the value of the gain change amount G', calculated using equation (2), and adds the corresponding shutter speed change amount to the shutter speed determined at S304. For example, in a case where the gain change amount G', derived with equation (2), is 190, the CPU 107 refers to the image capturing condition changing table and makes a setting change such that the shutter speed determined at S304 is shortened by one stop.

Image Capturing Condition Changing Tables

Figure 5:
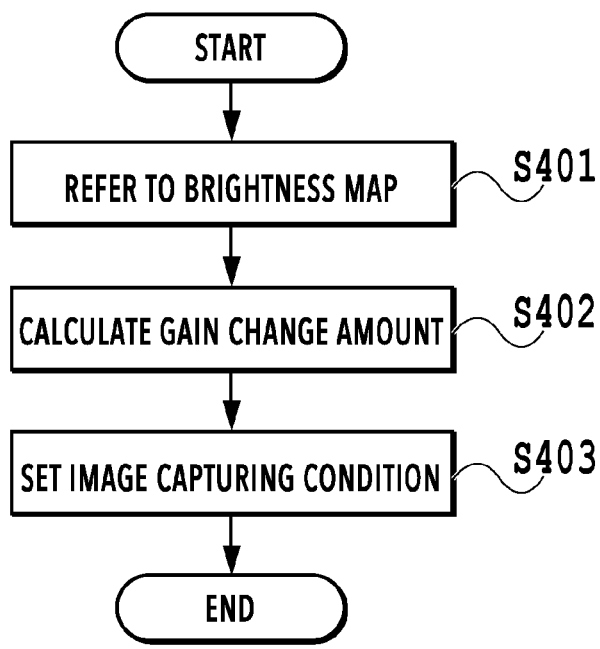
FIG. 5 is a flowchart showing the flow of an ISO sensitivity setting changing process in one embodiment.
Figure 6:
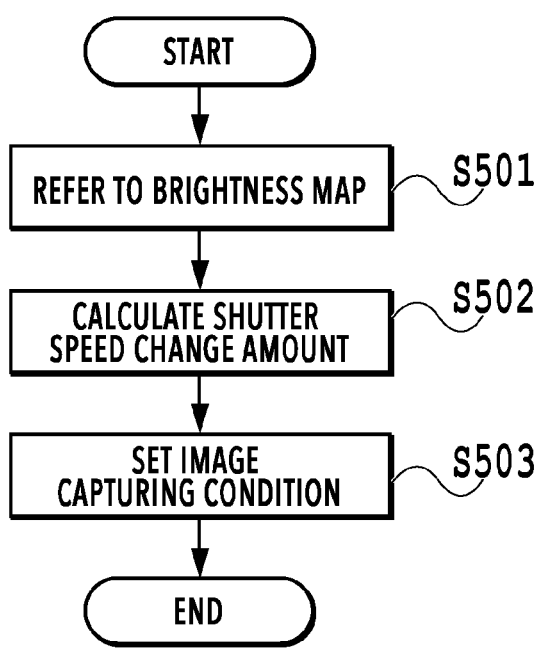
FIG. 6 is a flowchart showing the flow of a shutter speed setting changing process in one embodiment.

FIGS. 7A and 7B show an example of the image capturing condition changing tables used at S402 in FIG. 5 and S502 in FIG. 6. FIG. 7A shows the image capturing condition changing table used to change the ISO sensitivity, and the associations between brightness map values and ISO values are shown. FIG. 7B shows the image capturing condition changing table used to change the shutter speed, and the associations between shutter speed (Tv) values and brightness map values are shown.

As described above, according to the present embodiment, it is possible to generate an image of a scene with a wide dynamic range in such a manner as to prevent a sense of incongruity in a moving object portion.

Second Embodiment

Next, a second embodiment of the present disclosure will be described. In the present embodiment, the exposure amount for a moving object is corrected by using both shutter speed and gain. This is because in a case where of varying the exposure amount correction for a moving object to be imaged according to the speed of the moving object in a situation where the speed of the moving object is very high or the moving object is very bright or dark, for example, the exposure amount for the moving object portion cannot be sufficiently adjusted only by ISO sensitivity correction in some cases.

Figure 8:
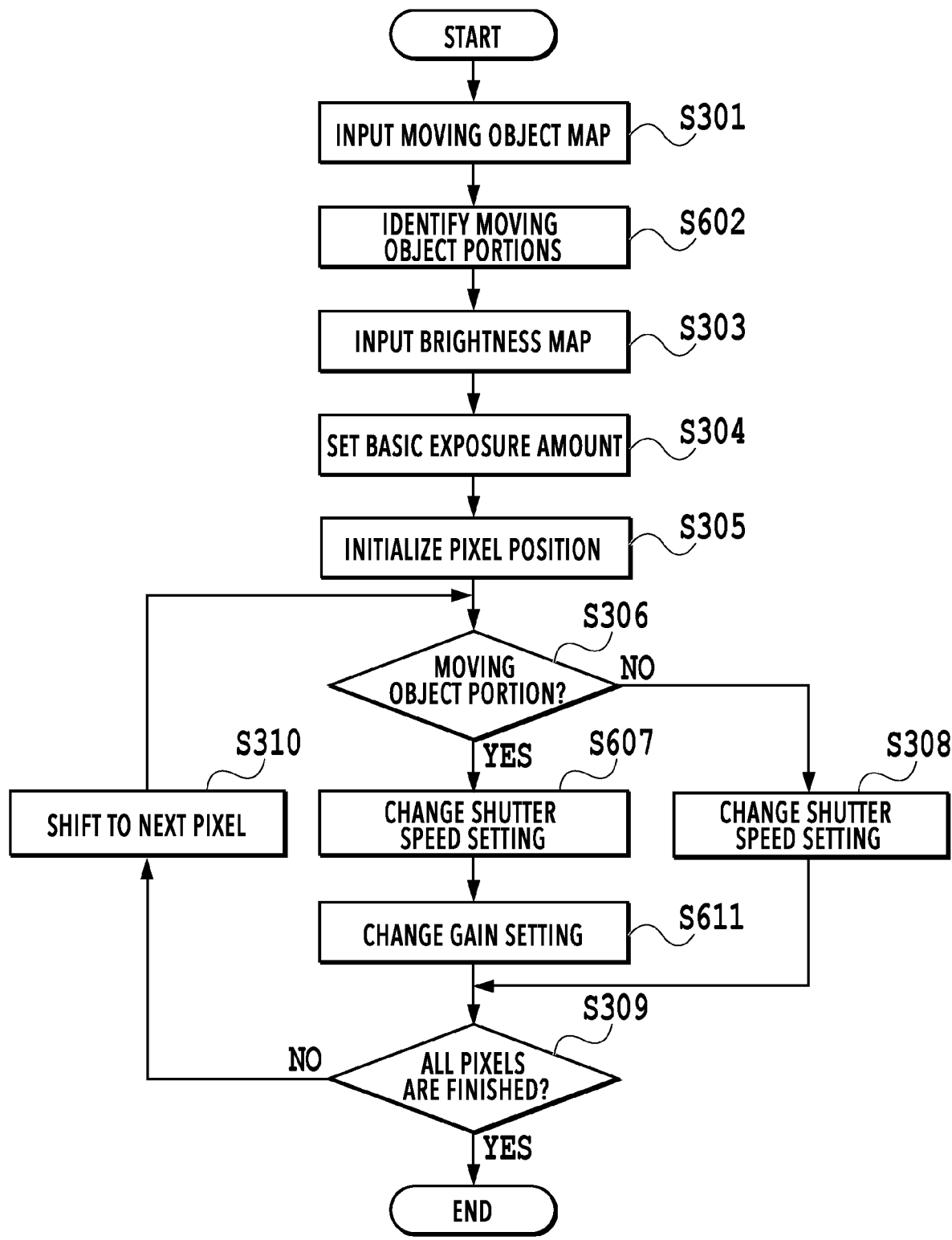
FIG. 8 is a flowchart showing the overall flow of an image capturing process in one embodiment.

The overall flow of an image capturing process in the present embodiment will be described first with reference to a flowchart in FIG. 8. Also, FIG. 9 shows an example of a moving object map value updating table in the present embodiment, and FIGS. 10A and 10B show an example of image capturing condition changing tables in the present embodiment. Note that in the description of the present embodiment, the differences from the first embodiment will be mainly described.

The present embodiment differs from the first embodiment in the method of grouping pixels in the moving object map, the method of setting a gain allocation condition, and the method of setting the shutter speed.

At S602, on the basis of the moving object map inputted in the RAM 109, the CPU 107 identifies regions corresponding to moving objects as moving object regions. Specifically, the CPU 107 determines the portions in the moving object map with values larger than or equal to a predetermined value as moving object portions as shown by the table shown in FIG. 9, and updates these values in the moving object map on the basis of the table in FIG. 9. For example, in a case where the value of a portion in the moving object map is 150, the CPU 107 updates the value in the moving object map to 128. Also, the CPU 107 determines the portions in the moving object map with values smaller than the predetermined value as non-moving object regions, and updates these values in the moving object map to 0, which is the minimum value. Note that the value ranges are not limited to the sets of values shown in FIG. 9 but different sets of values may be used as values ranges.

At S607, the CPU 107 refers to the value of the portion in the illuminance distribution map corresponding to the processing target pixel position, and calculates the average illuminance of the pixels having the same moving object map value. Then, in accordance with the table in FIG. 10A, the CPU 107 changes the shutter speed for the pixels having the same moving object map value. In addition, the CPU 107 corrects the values of the above pixels in the illuminance map having the same moving object map value. For example, in a case where the illuminance of a moving object pixel is 100 and the average illuminance of the corresponding moving object portion is 50, the CPU 107 lengthens the shutter speed for the moving objecting portion by one stop and subtracts 50 from the value in the illuminance map to change it to 50.

At S611, the CPU 107 refers to the table in FIG. 10B and sets an image capturing condition with a changed gain for the moving object portion. By these operations, for moving object portions determined to be moving at the same speed, the shutter speed is set to the same value while the gain is changed according to the illuminances of the respective objects. In this way, even in a case where regions differing in brightness are present within a moving object, the same shutter speed is applied to the moving object. Then, even if the moving object is blurred, the amount of blur is the same within the moving object. This prevents a sense of incongruity. Also, in a case where of handling a wholly dark moving object, a wholly bright moving object, or the like by changing only the gain, as in the first embodiment, it is necessary to apply a high gain to the moving object portion. In the present embodiment, even in such a case, the shutter speed is changed for the whole moving object, so that the amount of blur is the same within the moving object. In addition, even in a case where regions differing in illuminance are present within a moving object, it is possible to set a more suitable exposure condition by changing the gain.

As described above, according to the present embodiment, an image with a proper exposure amount adjustment is obtained even in a case where the exposure amount for a moving object region cannot be sufficiently adjusted only with ISO sensitivity.

Note that the present disclosure is applicable to a plurality of images to be combined. In that case, for the capturing of images containing a moving object, the same shutter speed is set for the plurality of images. Since these images are combined, the difference in blur between the moving object portions is eliminated. Hence, an image with a reduced sense of incongruity is obtained.

Meanwhile, in the above embodiment, a case of using a sensor capable of setting an image capturing condition on a pixel-by-pixel basis has been exemplarily described. However, the present disclosure is applicable also to a case of using a sensor capable of setting an image capturing condition on a region-by-region basis. In this case, for a region containing an object that is a moving object, the image capturing condition is set such that the same shutter speed is set for the region.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to generate an image of a scene with a wide dynamic range in such a manner as to prevent a sense of incongruity in a moving object portion.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-175131, filed Sep. 19, 2018 and Japanese Patent Application No. 2019-134378, filed Jul. 22, 2019 which are hereby incorporated by reference wherein in their entirety.

What is claimed is:

1. An image processing apparatus capable of acquiring an image while controlling an image capturing condition on a pixel-by-pixel basis or on a region-by-region basis, comprising:
at least one circuit configured to function as:
an obtaining unit configured to obtain brightness information of the image; and
a setting unit configured to set the image capturing condition for each pixel or each region on a basis of the brightness information,
wherein for pixels corresponding to a moving object region of the image, the setting unit sets shutter speeds which are different from shutter speeds which are set for pixels corresponding to a non-moving object region of the image.

2. The image processing apparatus according to claim 1, wherein the setting unit determines a basic exposure amount for capturing the image and sets an image capturing condition corresponding to the basic exposure amount, and then determines an ISO sensitivity for each of the pixels corresponding to the moving object region without changing the shutter speed.

3. The image processing apparatus according to claim 2:
wherein the setting unit determines a change amount to the ISO sensitivity on a basis of a difference between the brightness information on the object and the basic exposure amount.

4. The image processing apparatus according to claim 1, wherein the setting unit determines a basic exposure amount for capturing the image and sets an image capturing condition corresponding to the basic exposure amount, and then determines a shutter speed for each of pixels corresponding to a non-moving object region without changing an ISO sensitivity, the non-moving object region being a region not determined as the moving object region.

5. The image processing apparatus according to claim 4:
wherein the setting unit determines a change amount to the shutter speed on a basis of a difference between the brightness information on the object and the basic exposure amount.

6. The image processing apparatus according to claim 1, further comprising:
an identification unit configured to identify a moving object region in the image on a basis of motion information on the object;
wherein the motion information is a moving object map generated by averaging changes in luminance between pieces of captured image data in units of a plurality of pixels, the pieces of captured image data being captured in time series.

7. The image processing apparatus according to claim 6, wherein the identification unit identifies the moving object region according to an amount of motion based on the motion information.

8. The image processing apparatus according to claim 6, wherein the setting unit determines a basic exposure amount for capturing the image, and sets an image capturing condition corresponding to the basic exposure amount for all pixels until the identification unit identifies the moving object region.

9. The image processing apparatus according to claim 1, wherein the brightness information is a brightness map generated by averaging brightnesses of pixels in units of a plurality of pixels.

10. The image processing apparatus according to claim 1, wherein the one or more processors further function as:
a calculation unit configured to calculate an average illuminance of the same object on a basis of the moving object region and the brightness information,
wherein the setting unit sets a shutter speed for each pixel in the moving object region on a basis of the average illuminance.

11. The image processing apparatus according to claim 10, wherein in a case where there is a pixel with an illuminance higher than the average illuminance in the moving object region, the setting unit controls the shutter speed for the moving object region to lengthen the shutter speed.

12. The image processing apparatus according to claim 11, wherein the brightness information on the object is an illuminance map.

13. The image processing apparatus according to claim 12, wherein the obtaining unit updates values of pixels with the illuminance higher than the average illuminance among the pixels in the moving object region in the illuminance map to the average illuminance.

14. The image processing apparatus according to claim 1:
wherein for pixels corresponding to a non-moving object region, the setting unit sets a different shutter speed for at least some of the pixels in accordance with the brightness information.

15. A method of controlling an image processing apparatus capable of capturing an image while controlling an image capturing condition on a pixel-by-pixel basis or on a region-by-region basis, the method comprising the steps of:
obtaining brightness information of the image; and
setting the image capturing condition for each pixel or each region on a basis of the brightness information, for pixels corresponding to a moving object region of the image, setting shutter speeds which are different from shutter speeds which are set for pixels corresponding to a non-moving object region of the image.

* * * * *